United States Patent
Wade et al.

(10) Patent No.: US 8,967,465 B1
(45) Date of Patent: Mar. 3, 2015

(54) AUDIO SIGNALING TRAINING FOR BIDIRECTIONAL COMMUNICATIONS

(71) Applicant: Square, Inc., San Francisco, CA (US)

(72) Inventors: Jeremy Wade, San Fancisco, CA (US); Dan Post, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 14/220,967

(22) Filed: Mar. 20, 2014

Related U.S. Application Data

(60) Provisional application No. 61/909,672, filed on Nov. 27, 2013.

(51) Int. Cl.
| | |
|---|---|
| G06K 5/00 | (2006.01) |
| G06F 17/00 | (2006.01) |
| G06K 7/00 | (2006.01) |
| G06K 7/08 | (2006.01) |
| G06K 19/00 | (2006.01) |
| G06K 19/06 | (2006.01) |
| G06Q 20/34 | (2012.01) |
| H04L 25/02 | (2006.01) |
| H04L 29/08 | (2006.01) |

(52) U.S. Cl.
CPC ........ *G06Q 20/3567* (2013.01); *H04L 25/0292* (2013.01); *H04L 67/141* (2013.01)
USPC ........... 235/380; 235/493; 235/375; 235/435; 235/369; 235/449; 235/451; 235/487; 235/492

(58) Field of Classification Search
USPC ......... 235/380, 375, 435, 439, 449, 451, 487, 235/492, 493
See application file for complete search history.

(56) References Cited

U.S. PATENT DOCUMENTS

| | | | |
|---|---|---|---|
| 3,854,036 | A | 12/1974 | Gupta et al. |
| 4,254,441 | A | 3/1981 | Fisher |
| 5,173,597 | A | 12/1992 | Anglin |
| 5,589,855 | A | 12/1996 | Blumstein et al. |
| 5,679,943 | A | 10/1997 | Schultz et al. |
| 6,021,944 | A | 2/2000 | Arakaki |
| 6,032,859 | A | 3/2000 | Hughes et al. |
| 6,061,666 | A | 5/2000 | Do et al. |
| 6,234,389 | B1 | 5/2001 | Valliani et al. |
| 6,400,517 | B1 | 6/2002 | Murao |
| 6,476,743 | B1 | 11/2002 | Brown et al. |
| 7,309,012 | B2 | 12/2007 | Von Mueller et al. |

(Continued)

FOREIGN PATENT DOCUMENTS

WO     2010/111130     9/2010

*Primary Examiner* — Daniel Walsh
(74) *Attorney, Agent, or Firm* — Novak Druce Connolly Bove + Quigg LLP

(57) ABSTRACT

Aspects of the subject disclosure provide a card reader for receiving payment card information at a mobile point-of-sale terminal. In some implementations, a reader of the subject technology can include a memory, a conditioning module and a 3.5 mm audio plug including an audio bus that is configured for insertion into a headphone port of a host device, such as a smart phone or tablet computer. Implementations of the subject technology also include a microprocessor configured to perform operations for tuning communication parameters. That is, upon connection of the reader device to the host computing device, the devices can engage in an exchange of carrier waves which the devices exchange can used to not only determine and negotiate operational parameters for the devices that support a highest possible connection speed with acceptable connection quality.

21 Claims, 4 Drawing Sheets

(56) References Cited

U.S. PATENT DOCUMENTS

| | | | |
|---|---|---|---|
| 7,600,673 B2 | 10/2009 | Stoutenburg et al. | |
| 7,703,676 B2 | 4/2010 | Hart et al. | |
| 7,757,953 B2 | 7/2010 | Hart et al. | |
| 7,793,834 B2 | 9/2010 | Hachey et al. | |
| 7,810,729 B2 | 10/2010 | Morley, Jr. | |
| 8,011,587 B2 | 9/2011 | Johnson et al. | |
| 8,231,055 B2* | 7/2012 | Wen | 235/449 |
| 8,297,507 B2 | 10/2012 | Kayani | |
| 8,336,771 B2 | 12/2012 | Tsai et al. | |
| 8,376,239 B1 | 2/2013 | Humphrey | |
| 8,500,010 B1* | 8/2013 | Marcus et al. | 235/380 |
| 8,560,823 B1 | 10/2013 | Aytek et al. | |
| 8,571,989 B2* | 10/2013 | Dorsey et al. | 705/44 |
| 8,573,487 B2* | 11/2013 | McKelvey | 235/380 |
| 8,573,489 B2* | 11/2013 | Dorsey et al. | 235/380 |
| 8,584,946 B2* | 11/2013 | Morley, Jr. | 235/449 |
| 8,602,305 B2* | 12/2013 | Dorsey et al. | 235/449 |
| 8,612,352 B2* | 12/2013 | Dorsey et al. | 705/44 |
| 8,615,445 B2* | 12/2013 | Dorsey et al. | 705/26.1 |
| 8,640,953 B2* | 2/2014 | Dorsey et al. | 235/449 |
| 8,662,389 B2* | 3/2014 | Dorsey et al. | 235/380 |
| 8,678,277 B2* | 3/2014 | Dorsey et al. | 235/380 |
| 8,701,996 B2* | 4/2014 | Dorsey et al. | 235/449 |
| 8,701,997 B2* | 4/2014 | Dorsey et al. | 235/449 |
| 8,763,900 B2* | 7/2014 | Marcus et al. | 235/380 |
| 8,794,517 B1* | 8/2014 | Templeton et al. | 235/380 |
| 2002/0017568 A1 | 2/2002 | Grant et al. | |
| 2002/0165462 A1* | 11/2002 | Westbrook et al. | 600/529 |
| 2003/0132300 A1 | 7/2003 | Dilday et al. | |
| 2004/0033726 A1* | 2/2004 | Kao | 439/660 |
| 2004/0104268 A1 | 6/2004 | Bailey | |
| 2004/0128256 A1 | 7/2004 | Dhanjal et al. | |
| 2004/0151026 A1 | 8/2004 | Naso et al. | |
| 2005/0156037 A1* | 7/2005 | Wurzburg | 235/435 |
| 2005/0156038 A1* | 7/2005 | Wurzburg et al. | 235/435 |
| 2005/0194452 A1 | 9/2005 | Nordentoft et al. | |
| 2005/0219728 A1 | 10/2005 | Durbin et al. | |
| 2005/0236480 A1 | 10/2005 | Vrotsos et al. | |
| 2005/0247787 A1 | 11/2005 | Von Mueller et al. | |
| 2006/0000917 A1* | 1/2006 | Kim et al. | 235/492 |
| 2006/0049255 A1 | 3/2006 | Von Mueller et al. | |
| 2006/0152276 A1 | 7/2006 | Barksdale | |
| 2007/0063048 A1 | 3/2007 | Havens et al. | |
| 2008/0017712 A1 | 1/2008 | Hart et al. | |
| 2008/0040274 A1 | 2/2008 | Uzo | |
| 2010/0108762 A1* | 5/2010 | Morley, Jr. | 235/449 |
| 2010/0243732 A1 | 9/2010 | Wallner | |
| 2010/0314446 A1* | 12/2010 | Morley, Jr. | 235/449 |
| 2011/0053560 A1 | 3/2011 | Jain et al. | |
| 2011/0062235 A1* | 3/2011 | Morley, Jr. | 235/449 |
| 2011/0084140 A1 | 4/2011 | Wen | |
| 2011/0161235 A1 | 6/2011 | Beenau et al. | |
| 2011/0174879 A1* | 7/2011 | Morley, Jr. | 235/449 |
| 2011/0180601 A1* | 7/2011 | Morley, Jr. | 235/449 |
| 2011/0202463 A1 | 8/2011 | Powell | |
| 2012/0011024 A1* | 1/2012 | Dorsey et al. | 705/26.41 |
| 2012/0011071 A1* | 1/2012 | Pennock et al. | 705/75 |
| 2012/0052910 A1* | 3/2012 | Mu et al. | 455/558 |
| 2012/0095869 A1* | 4/2012 | McKelvey | 705/26.41 |
| 2012/0097739 A1* | 4/2012 | Babu et al. | 235/380 |
| 2012/0118956 A1* | 5/2012 | Lamba et al. | 235/437 |
| 2012/0118959 A1* | 5/2012 | Sather et al. | 235/449 |
| 2012/0118960 A1* | 5/2012 | Sather et al. | 235/449 |
| 2012/0126005 A1* | 5/2012 | Dorsey et al. | 235/437 |
| 2012/0126006 A1* | 5/2012 | Dorsey et al. | 235/437 |
| 2012/0126007 A1* | 5/2012 | Lamba et al. | 235/437 |
| 2012/0126010 A1* | 5/2012 | Babu et al. | 235/449 |
| 2012/0126011 A1* | 5/2012 | Lamba et al. | 235/449 |
| 2012/0126012 A1* | 5/2012 | Lamba et al. | 235/449 |
| 2012/0126013 A1* | 5/2012 | Sather et al. | 235/449 |
| 2012/0126014 A1* | 5/2012 | Sather et al. | 235/449 |
| 2012/0130903 A1* | 5/2012 | Dorsey et al. | 705/71 |
| 2012/0132712 A1* | 5/2012 | Babu et al. | 235/449 |
| 2012/0138683 A1* | 6/2012 | Sather et al. | 235/449 |
| 2012/0168505 A1* | 7/2012 | Sather et al. | 235/449 |
| 2012/0234918 A1* | 9/2012 | Lindsay | 235/449 |
| 2012/0259651 A1* | 10/2012 | Mallon et al. | 705/2 |
| 2012/0270528 A1* | 10/2012 | Goodman | 455/418 |
| 2013/0031003 A1* | 1/2013 | Dorsey et al. | 705/44 |
| 2013/0031004 A1* | 1/2013 | Dorsey et al. | 705/44 |
| 2013/0087614 A1 | 4/2013 | Limtao et al. | |
| 2013/0200147 A1* | 8/2013 | Dorsey et al. | 235/380 |
| 2013/0200148 A1* | 8/2013 | Dorsey et al. | 235/380 |
| 2013/0200149 A1* | 8/2013 | Dorsey et al. | 235/380 |
| 2013/0200153 A1* | 8/2013 | Dorsey et al. | 235/449 |
| 2013/0200154 A1* | 8/2013 | Dorsey et al. | 235/449 |
| 2013/0204788 A1* | 8/2013 | Dorsey et al. | 705/44 |
| 2013/0204791 A1* | 8/2013 | Dorsey et al. | 705/44 |
| 2013/0204792 A1* | 8/2013 | Dorsey et al. | 705/44 |
| 2013/0207481 A1 | 8/2013 | Gobburu et al. | |
| 2013/0254117 A1* | 9/2013 | von Mueller et al. | 705/71 |
| 2013/0254118 A1* | 9/2013 | Dorsey et al. | 705/71 |
| 2013/0320089 A1* | 12/2013 | Marcus et al. | 235/449 |
| 2014/0001257 A1* | 1/2014 | Dorsey et al. | 235/380 |
| 2014/0001263 A1* | 1/2014 | Babu et al. | 235/440 |
| 2014/0017955 A1* | 1/2014 | Lo et al. | 439/668 |
| 2014/0061301 A1 | 3/2014 | Cho et al. | |
| 2014/0076964 A1* | 3/2014 | Morley, Jr. | 235/379 |
| 2014/0097242 A1* | 4/2014 | McKelvey | 235/380 |
| 2014/0124576 A1 | 5/2014 | Zhou | |
| 2014/0144983 A1* | 5/2014 | Dorsey et al. | 235/380 |
| 2014/0203082 A1* | 7/2014 | Huh | 235/440 |

* cited by examiner

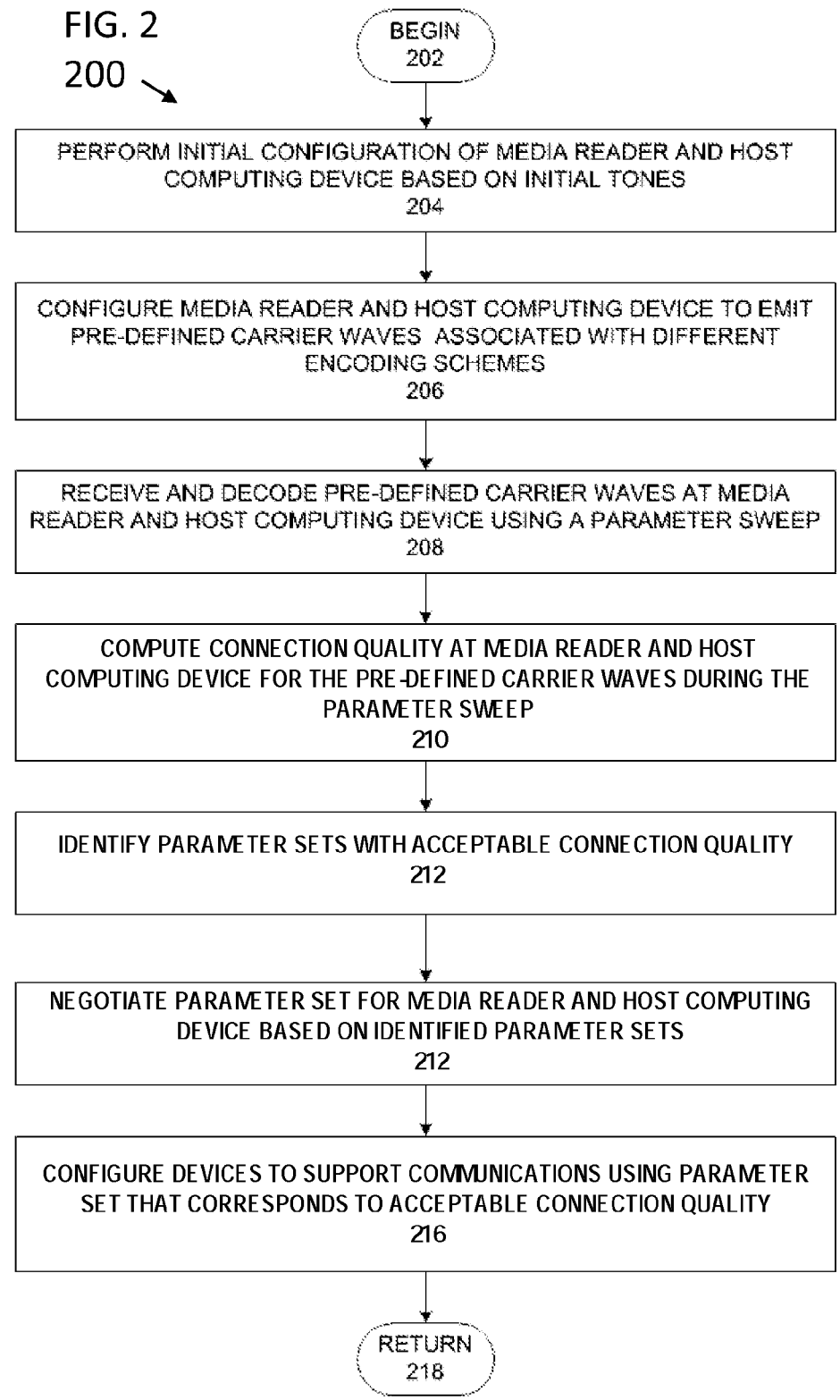

AUDIO SIGNALING TRAINING FOR BIDIRECTIONAL COMMUNICATIONS

CROSS-REFERENCE TO RELATED APPLICATIONS

The application claims the benefit of U.S. Provisional Patent Application No. 61/909,672, entitled "AUDIO SIGNALING TRAINING FOR BIDIRECTIONAL COMMUNICATIONS", filed on Nov. 27, 2013, and which is hereby expressly incorporated herein by reference in its entirety.

BACKGROUND

An increasing number of hardware attachments are available to expand upon the functional capabilities of mobile computing devices, such as smart phones. In some instances, card reader attachments, which enable the reading of payment information from a magnetic strip (such as a credit card), can be coupled to a host device via a standard 3.5 mm headphone port. However, due to limitations in transmitting data over such audio ports, some conventional card readers do not possess bi-directional communication capabilities. One impediment to bidirectional reader communication is the wide variation in configurations between different types of host devices. For example, different smart phones or tablet computers can possess a large degree of variation in the way they send and receive audio signals.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

FIG. 2 illustrates an example process training for bidirectional communications for a reader device and a host computing device;

DETAILED DESCRIPTION

Figure 1:
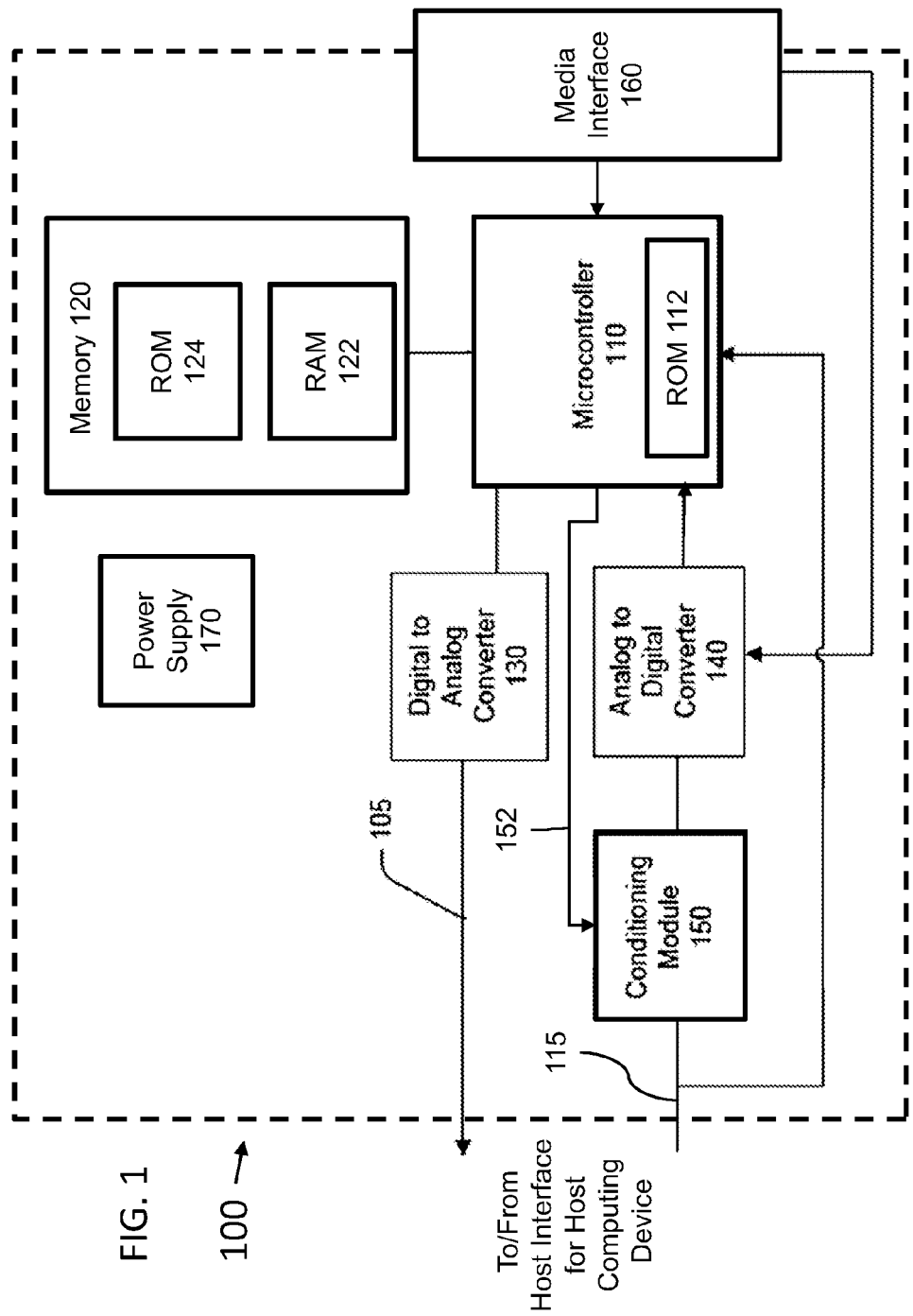
FIG. 1 illustrates a conceptual block diagram of hardware components used to facilitate training for bidirectional communications for a reader device and a host computing device.

The detailed description set forth below is intended as a description of various configurations of the subject technology and is not intended to represent the only configurations in which the technology can be practiced. The appended drawings are incorporated herein and constitute a part of the detailed description, which includes specific details for the purpose of providing a more thorough understanding of the subject technology. However, it will be clear that the subject technology is not limited to the specific details set forth herein and may be practiced without these specific details. In some instances, structures and components are shown in block diagram form in order to avoid obscuring the concepts of the subject technology.

As noted above, due to limitations in reliably transmitting data over audio ports, conventional card readers are typically restricted to unidirectional communications. In particular, these card reader devices are typically only capable of sending signals to a host mobile device. Further, when payment card information is read and transmitted by the card reader, the card reader has no way to acknowledge that the information has been properly received. In some conventional card reader implementations, the card reader can be configured to send multiple iterations of data to the host computing device (e.g., smart phone or tablet computer), in order to increase the likelihood that the correct data is received. However, it would be advantageous for the reader to receive signaling from the host computing device, for example, to provide acknowledgements and confirmation of data receipt. Additionally, bi-directional communication over the audio port could provide several other advantages, including but not limited to, enabling the card reader to configure reader-to-host communication, and for receiving reader firmware updates, etc.

The subject technology addresses the foregoing limitation by providing means by which bidirectional communication between a reader device and a host computing device can be used to train each of the devices in order "tune" communication parameters. That is, upon connection of the reader device to the host computing device, the devices can engage in an exchange of carrier waves which the exchange can used to not only determine and negotiate a connection speed parameters between the devices, but also to determine a set of custom transmit and receive parameters between devices. In particular, the set of custom parameters can be utilized to support data transfer between one device and another at a highest possible connection speed with acceptable bit error rate. This process is performed automatically and invisible to the user in most cases.

By way of example, upon connection to a 3.5 mm audio port of a host, a reader device will transmit a signal to the host computing device (e.g., smart phone) announcing that a connection is established. Software running on the smart phone receives the signal, and then replies with a predetermined message (tone) to test communication from the smart phone to the reader. Afterwards, a training process can occur at each end. In particular, the various connection speeds available can be tested with a variety of parameter settings at both the sending device and the receiving. The parameter settings then resulting in acceptable connection quality for data transmitted between the reader device and host computing device can then be identified for various connection speeds. As such, the process of tuning at each device can include receiving predefined carrier waves at each device that represent data and determining a connection quality as a function of parameter variations on one or both sides. Based on this analysis, suitable device configurations for both the reader device and the host computing device can be determined for different connection speeds.

FIG. 1 illustrates a conceptual block diagram of hardware components of a reader device 100 configured for bi-directional communications and training thereof, according to some aspects of the subject technology. Reader device 100 includes microcontroller 110, memory 120, digital-to-analog converter (DAC) 130, analog-to-digital converter (ADC) 140, conditioning module 150, media interface 160, and power supply 170. A host computing device (not shown) would include similar components, to support bidirectional communications with the reader device 100.

As illustrated, microcontroller 110 is coupled to memory 120, DAC 130 and ADC 140. Additionally, microcontroller 110 is coupled to conditioning module 150, via audio input channel 115, as well as media interface 160, either directly or via ADC 140. In turn, ADC 140 is coupled to conditioning module 150, via audio input channel 115. Via DAC 130, audio input channel 115, ADC 140, and audio output channel 105, the reader device 100 can engage in bidirectional communications with the host computing device using audio signaling, e.g., carrier waves representing audio signals.

In some embodiments, to reduce the number of components necessary in the reader device 100, various components can be configured to perform multiple tasks within the card reader 100. For example, ADC 140 can be configured for handling the conversion of analog signals obtained from media interface 160 (e.g., during a card swipe) to digital signals for use by the microcontroller 110 and also for handling the conversion of analog signals received via audio input channel 115 to digital signals for use by the microcontroller 110.

The microcontroller 110 can control DAC 130 to adjust the output characteristics of any audio signaling provided on audio output channel 105. These can include, but are not limited to: gain and frequency band of any amplifier in DAC 130. Additionally, the microcontroller 110 can adjust the frequency, amplitude, and phase for the modulation scheme used to encode digital data into the audio signaling. The present disclosure contemplates that the modulation for the audio signaling can occur within DAC 130, microcontroller 110, or another component (not shown) positioned in between DAC 130 and microcontroller 110. Thus, the "tuning" of the present technology can encompass adjusting any aspect of the encoding and generation of the audio signaling provided on audio output channel 105.

Audio signaling received on audio input channel 115 can be simultaneously provided to microcontroller 110 and conditioning module 150. Audio signaling received by the microcontroller 110 can be used to provide voltage information to the conditioning module so that the conditioning module parameters can be tuned to provide, for example, proper voltage offsets for the received audio signals via conditioning control line 152. In this way, the microcontroller 110 can "listen" to the received audio signal while adjusting conditioning parameters in order to standardize the received signals before digital conversion and further processing are performed. Conditioning module 150 can be configured to clamp incoming audio signals to eliminate negative voltage components. In certain aspects, an analog output of microcontroller 110 is provided to an ADC (e.g., ADC 140), and digital information about the received signal is output to conditioning module 150. The present disclosure contemplates that the microcontroller 110 can also adjust the frequency, amplitude, and phase for the demodulation scheme used to decode digital data from the audio signaling. The present disclosure contemplates that the demodulation can occur within ADC 140, microcontroller 110, or another component in between (not shown). Thus, during the "tuning" of the present technology can encompass adjusting any aspect of the detection and decoding of the audio signaling provided on audio input channel 115.

It is understood that reader device 100 can be implemented using various other hardware components and/or configurations, and is not limited to the architecture depicted in FIG. 1.

Microcontroller 110 can be implemented using a general-purpose processor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing.

Memory 120 can include various types of memories, including working memory in the form of random-access memory (RAM) 122 and read-only memory (ROM) 124. Additionally, various types of memory can be utilized in place of, or in addition to, memory 120. For example, the one or more sequences of instructions for operating the reader device 100 can be stored as the bootloader software or firmware in a ROM 112 within microcontroller 110 or in the ROM 124 within memory 120. One or more sequences of instructions can also be software stored and read from another storage medium, such as the flash memory array, or received from the host computing device (e.g., a mobile device such as a smart phone or tablet computing device) via a host interface. ROM, storage mediums, and flash memory arrays represent examples of machine or computer readable media storing instructions/code executable by microcontroller 110. Machine or computer readable media may generally refer to any medium or media used to provide instructions to microcontroller 110, including both volatile media, such as dynamic memory used for storage media or for buffers within microcontroller 110, and non-volatile media, such as electronic media, optical media, and magnetic media.

Audio output channel 105 and audio input channel 115 can form a portion of an audio bus or connector, such as a standard 3.5 mm audio plug (not shown) or other audio connector type. In some implementations, audio input channel 115 can include multiple audio input channels, such as a left-audio input channel and a right-audio input channel.

Media interface 160 can form a device, or portion thereof, for reading media located on credit cards, debit cards, or objects to obtain payment information. In some implementations, the media interface 160 can be configured to read information from a physical storage medium, such as magnetic storage media (e.g., magnetic stripe media), optical storage media (e.g., barcodes or patterns), radio-frequency identification (RFID) storage devices, and integrated circuit card media (e.g., smart chip technologies), to name a few. Alternatively or in addition to the capability of reading such passive media, the media interface 160 can also be configured in some implementations to provide a wireless or wireline interface for interacting with other devices to provide such payment information.

Now that some basic components of a system supporting bidirectional communications have been provided, the disclosure turns to a more detailed description of the methodology for tuning communication parameters in accordance with the present technology. In particular, FIG. 2 shows a flowchart of steps in an exemplary method 200 for performing such tuning or training in accordance with the present technology. Although method 200 will be primarily described with tuning or training from the perspective of a reader device, this is solely for illustrative purposes. The present disclosure contemplates that a same or similar process would be utilized for tuning or training components at the host computing device.

Method 200 begins at step 202 and continues to step 204. At step 204, an initial configuration of the reader device and the host computing device is performed. In general, when the reader device is connected to the host computing device, the reader device will generate an "announce" tone or signal for the host computing device. The host computing device can then respond with a "response" tone or signal that acknowledges receipt of the "announce" signal. Optionally, the reader device can respond to the host computing device to acknowledge receipt of the "response" signal. The present disclosure contemplates that step 204 can include some preliminary tuning of communication parameters. For example, a gain and bias used by an amplifier at the reader device to generate the "announce" tone can be adjusted if no "response" tone is received to ensure that the "announce" tone was "heard" at the host computing device. Similarly, at the host computing device, if the "announce" tone is not detected, a gain and bias used by an amplifier at the host computing device can also be adjusted to attempt to detect the "announce" tone. A similar process can be performed to ensure transmission and detection of the "response" tone at the host computing device and the reader device, respectively.

Once the initial configuration at step 204 is performed, an initial communication link is available between the reader device and the host computing device and the method 200 can proceed to step 206. At step 206, each of the reader device and the host computing device are then configured to, serially or contemporaneously, transmit signals including a pre-defined series of carrier waves, where each of the carrier waves is encoded with a set of data. The series of carrier waves can be generated using parameter sets designed to support various connection speeds. In the various implementations, the parameter sets (e.g., the modulation scheme used or error correction code used) are known or pre-defined, the set of data encoded is known or pre-defined or both.

One aspect of the present technology is to provide a "sweep" of parameters used to detect the carrier waves at a receiving device. Therefore, the present disclosure contemplates that step 206 can encompass sending the same carrier wave multiple times so that it can be received and decoded using different sets of parameters at the receiving device. In the various implementations, the repetition of the carrier waves can be performed in a variety of ways. In some implementations, the transmit signal can transmit a sequence of that repeats the same carrier wave multiple times as parameters are varied and repeats this process for other carrier waves. In other implementations, the sequence of carrier waves can include multiple, different carrier waves for parameter set and this sequence can be retransmitted multiple times while varying the parameter set. The number of repetitions of either type of sequence can be pre-defined or determined dynamically, as explained below.

At step 208, the carrier waves generated at step 206 are received and decoded at each of the reader device and the host computing device. Further, for different instances of the same carrier wave, the carrier wave can be received, decoded, or both using different sets of parameters. As noted above, this can include, for example, different gain and bias settings for an amplifier and variations in demodulation parameters. However, the present technology is not limited in this regard and any other parameter that affects how a carrier wave is received or decoded can be varied for each instance of a carrier wave. For example, as shown in FIG. 1, the conditioning module 150 providing conditioned analog signals to the ADC 140 can be controlled during a parameter sweep. In particular, the microcontroller 110 can adjust parameters of the conditioning module along with any other parameters associated with receiving signals along input channel 115.

Following or contemporaneously with the receiving and decoding at step 208, a quality of the connection can be evaluated. For example, a bit error rate (BER) can be computed for each of the carrier wave instances during the parameter sweep at step 210. However, the carrier wave instances can be evaluated with respect to any other measure of connection quality. Thereafter, at step 212, the parameter sets for which the connection quality is acceptable are identified. Based on these identified parameter sets, the devices can then negotiate the parameter set to be used for communications at step 214. The present disclosure contemplates that the negotiation can be performed in a variety of ways. In some implementations, the negotiation process can require that both devices utilize the same parameter set for bidirectional communication. Thus, the negotiation process can consist of exchanging the parameter sets with acceptable connection quality at each device and selecting a common parameter set for the devices in which the connection quality is acceptable and is associated with a highest possible connection speed. In other implementations, the negotiation process can allow the devices to transmit data at different connection speeds. Therefore, the "negotiation" can consist simply of the receiving device indicating to the sending device the one of the identified parameter sets it wishes to utilize to receive data.

Once the negotiation is completed at step 214 and the parameter set to be used at each device is selected, the method 200 can proceed to step 216. At step 216, the devices are then configured to support receiving and decoding of signals using the parameter set selected at step 214. The method can then proceed to step 218 to resume previous processing, including the repeating of method 200.

The present disclosure contemplates that over time, the connection between the reader device and the host computing device may degrade for various reasons. For example, interference from nearby sources can affect the quality of the connection between the devices. Accordingly, in some implementations, the connection quality can be monitored during use. If the connection quality degrades past a threshold amount, then method 200 can be repeated to determine a new set of parameters. Alternatively, method 200 can be repeated automatically, to ensure a highest quality connection at all times. The method can be repeated on a scheduled basis, whenever there is a period of inactivity, or based on a combination of both. In some instances, this process can be performed on demand. For example, a user at the host computing device can request that the method be performed upon command.

Further, although method 200 has been primarily described with adjusting parameters at the receiving device, the parameter sweep can also include adjusting parameters for the transmitting device. That is, the sequences of carrier waves can not only be repeated for different sets of parameters at the receiving device, but also for different sets of parameters at the sending device (e.g., gain, bias, modulation, and error correction configuration). Additionally, a combination of both can be provided. Accordingly, variations in the instances for carrier waves for a particular parameter sets can be received. Thereafter, once the connection quality associated with such variations in the instances are determined and the appropriate parameters are identified, the negotiation process can then entail requesting the sending device to transmit according to the particular variation in the parameter set deemed at the receiving device to be associated with a highest possible connection speed and an acceptable connection quality. It is further contemplated that in the case where connection quality remains poor or appears to be close to being unacceptable, the receiving device can request that the sending device provide adjustments beyond those already provided in order to improve the connection quality.

As also noted above, an audio plug or connector can be configured with more than one input channel and more than one output channel. Accordingly, the present disclosure contemplates that the method described above for identifying an parameter set for a receiving device can be performed on a per-channel basis. Thus, different channels may be associated with the same or different parameter sets.

The present disclosure also contemplates that method 200 can be performed on a per-encoding scheme basis. That is, a sending device can transmit a sequence repeating a carrier wave for an encoding scheme associated with a highest connection speed first. Thereafter, if parameters exist that result in a connection quality that is acceptable for the encoding scheme, the encoding scheme is selected. If no such parameters exist, then the sending device can transmit a sequence repeating a carrier wave for an encoding scheme associated with a next highest connection speed to determine if an acceptable combination of encoding scheme and parameters can be found. This process can be repeated as necessary.

As noted above, method 200 relies of receiving and decoding a carrier wave a number of different times using different sets of parameters. The present disclosure contemplates that the different sets of parameters can be selected in variety of ways. For example, as discussed below, the selection of parameters can be based on the encoding schemes being used. However, the selection of parameters can be based on other factors.

First, as to the number of parameters sets, the present disclosure contemplates receiving and decoding for each encoding scheme with the same number of parameter sets. However, in other implementations, the number of parameter sets can be different. For example, for encoding schemes that are known to be less prone to errors, a smaller number of parameter sets can be used as compared to encoding schemes that are more prone to errors. In another example, the number of sets can be based on the devices themselves. That is, if certain combinations of reader devices and host computing devices are known to be more or less error prone, the number of parameter sets can be adjusted accordingly. In still another example, the number of parameter sets can be determined dynamically. That is, if the calculation of connection quality is being performed as carrier waves are received and decoded, as soon as a connection quality is calculated that is acceptable, the sweep can be terminated. These examples are provided for illustrative purposes only and the present disclosure contemplates that other methods of determining the number of parameter sets can be used.

Second, as the values of the parameters in the sets, all encoding schemes can be received and decoded with all possible parameter values in some implementations. However, in other implementations, the parameter values used can vary based on the encoding scheme. In another example, the sets of parameters can be based on the devices themselves. That is, for certain combinations of reader devices and host computing devices the values for the parameter sets can be selected accordingly. Additionally, the values for the parameters can also vary based on the initial configuration at step 204.

Figure 3A:
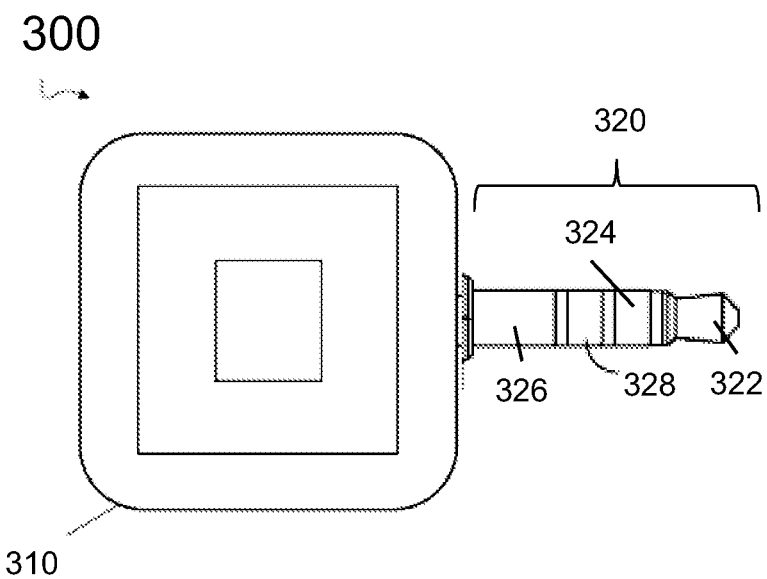
FIGS. 3A and 3B illustrate front and side views of an example card reader device, including a 3.5 mm audio plug.
Figure 3B:
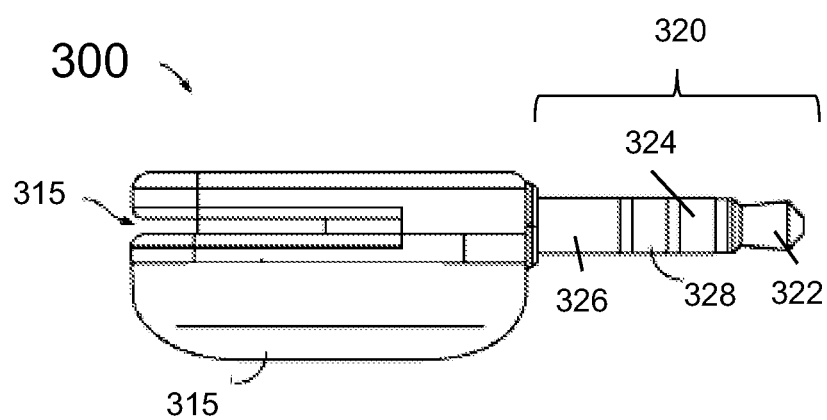

FIGS. 3A and 3B illustrates an example reader 300 according to some embodiments of the subject technology. As illustrated, reader 300 includes a housing 310 that is coupled to an audio plug 320 (e.g., a 3.5 mm audio plug).

Housing 310 contains the hardware components and circuitry of reader 300, as illustrated with respect to the example of FIG. 1. Additionally, body portion 310 includes a slot 315 through which a payment card, such as a credit or debit card, may be swiped. Passage of a magnetic stripe of the payment card past a read head (e.g., media interface 160 contained in housing 310) can enable payment information to be received via the read head. The resulting signal provided by the read head is typically an analog signal that must be digitized e.g., using ADC 140, before the resulting digital information is provided to microcontroller 110.

Different types of information can be read from a magnetic stripe, depending on implementation. For example, user and payment card account information can be read from track 1 and track 2 of the magnetic stripe, respectively. However, in other implementations, any track (or combination of tracks) may be read from the magnetic stripe, including any combination, or all of tracks 1, 2 and 3.

As illustrated, body portion 310 is physically and communicatively coupled to audio plug 320, which can be removably inserted into a headphone port of a host device, such as a smart phone, personal computer, tablet device, or the like. As discussed above with respect to FIG. 1, audio plug 320 forms part of an audio bus that includes left and right audio output channels (via left/right contacts 322, 324), an audio input channel (via microphone contact 326), and a ground connection (via ground contact 328). Once audio plug 320 is inserted into the compatible jack of a host device, such as a smartphone, bi-directional communication between reader 300 and the host is enabled e.g., via the left/right audio output channels and audio input channel, using the methods and systems discussed above.

Although the reader illustrated in FIG. 3 can accept payment cards containing a magnetic stripe (e.g., using a read head), it is understood that the reader can be configured to receive other types of payment cards, and accordingly can contain additional or different hardware and/or software modules than those described above with respect to FIG. 1. For example, housing 310 can include a dip slot for accepting integrated circuit cards, such as those conforming to the Europay, Mastercard, and Visa (EMV) standard.

Once successful bidirectional communication has been established between the reader and its host, the reader can be used to facilitate a payment transaction, for example between a merchant and a buyer using a magnetic payment card.

Figure 4:
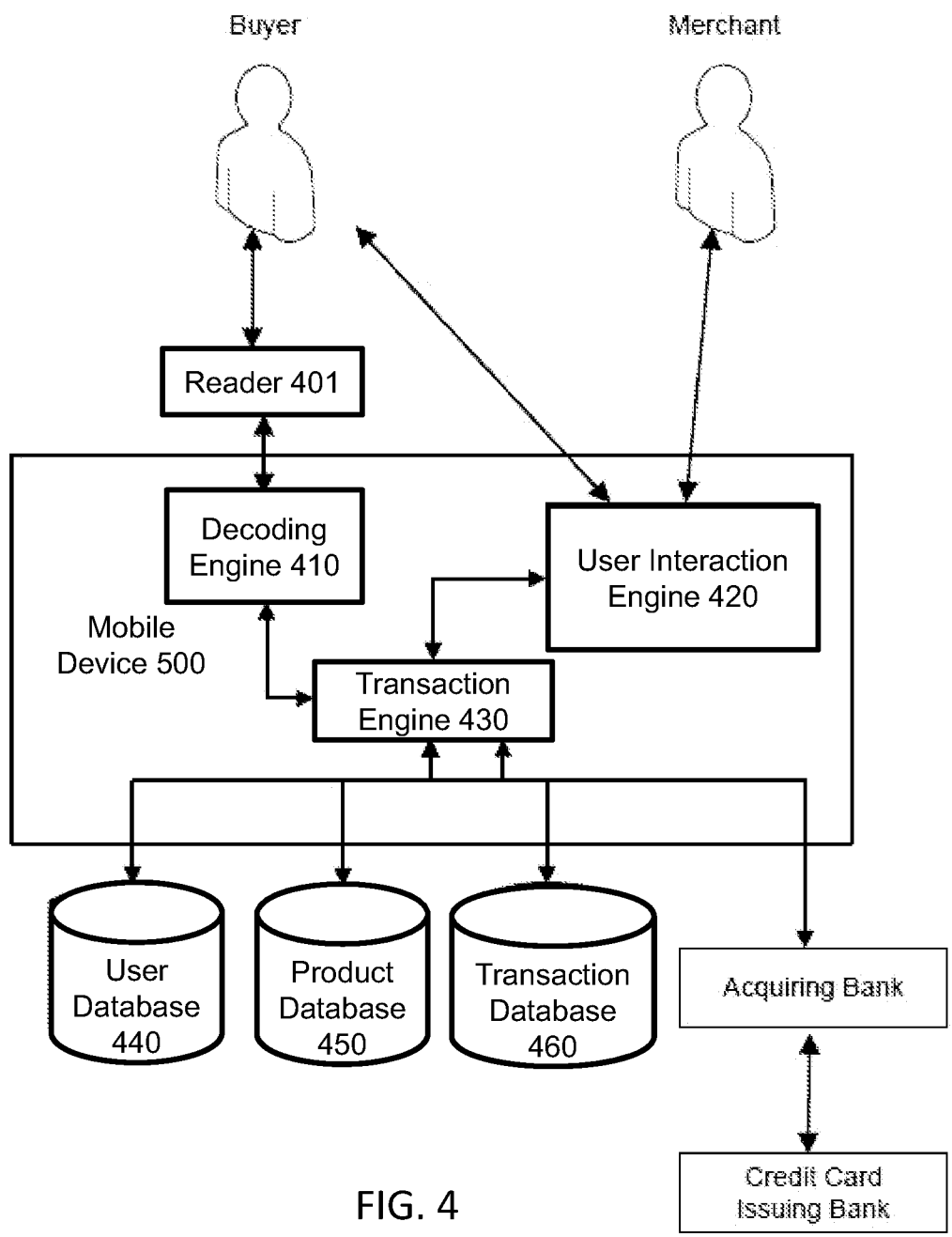
FIG. 4 depicts a conceptual environment in which a reader device of the subject technology can be used to facilitate a financial transaction between a buyer and a merchant.

FIG. 4 depicts a conceptual environment in which a reader of the subject technology can be used to facilitate a financial transaction between a buyer and a merchant. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein multiple hosts can be connected by one or more networks.

In the example of FIG. 4, the system includes a mobile device 400, a reader 401 connected to mobile device 400, a decoding engine 410, a user interaction engine 420, and a transaction engine 430, all running on mobile device 400. Additionally, the system may also include one or more of a user database 440, a product or service database 450, and a transaction database 460, and a firmware database 470 all coupled to the transaction engine 430. Thus, to perform firmware updates in accordance with the present technology, the transaction engine 430 can invoke an update routine to retrieve updated firmwares and associated information from firmware database 470.

As used herein, the term engine refers to software, firmware, hardware, and/or other components used to effectuate a purpose. The engine will typically include software instructions that are stored in non-volatile memory (also referred to as secondary memory). When the software instructions are executed, at least a subset of the software instructions is loaded into memory (also referred to as primary memory) by a processor. The processor then executes the software instructions in memory. The processor may be a shared processor, a dedicated processor, or a combination of shared or dedicated processors. A typical program will include calls to hardware components (such as I/O devices), which typically requires the execution of drivers. The drivers may or may not be considered part of the engine, but the distinction is not critical.

As used herein, the term database is used broadly to include any known or convenient means for storing data, whether centralized or distributed, relational or otherwise.

In the example of FIG. 4, mobile device 400 to which reader 401 is connected can be, but is not limited to, a cell phone, such as Apple's iPhone, other portable electronic devices, such as Apple's iPod Touches, Apple's iPads, and mobile devices based on Google's Android operating system and any other portable electronic device that includes software, firmware, hardware, or any combination capable of at least receiving the signal, decoding if needed, exchanging information with a transaction server to verify the buyer and/or seller's account information, conducting the transaction, and generating a receipt. Typical components of mobile device 400 can include but are not limited to persistent memories like flash ROM, random access memory like SRAM, a camera, a battery, LCD driver, a display, a cellular antenna, a speaker, a Bluetooth circuit, and WiFi circuitry, where the persistent memory may contain programs, applications, and/or an operating system for the mobile device.

In some implementations, a system is provided with transaction engine 430 running on mobile device 400. In response to a financial transaction between a buyer and a seller, mobile device 400 accepts information selected including but not limited to information from financial transaction or information pertaining to financial transaction card used by the buyer in the transaction. Additionally, a financial transaction device can be utilized, Non-limiting examples of financial transaction devices include but are not limited to a, wristband, RFID chip, cell phone, biometric marker and the like. At least a portion of this information is communicated with a third party financial institution or payment network to authorize the transaction.

Payment confirmation can be made with a communication channel of the buyer's choice. As non-limiting examples, confirmation of payment can be an electronic notification in the form selected from at least one of, email, SMS message, tweet (message delivered via Twitter), instant message, communication within a social network and the like. In response to the transaction, a confirmation is made that the buyer is authorized to use the financial transaction card. In certain implementations, a confirmation can be provided that indicates a sufficiency of funds available to the buyer.

In the example of FIG. 4, reader 401 is configured to read data encoded in a magnetic strip of a card being swiped by a buyer and send a signal that corresponds to the data read to mobile device 400. However, as discussed above, reader 401 may be configured to received various payment card types, including but not limited to IC cards that can be provided to reader 401 using a dip slot.

The size of reader 401 can be miniaturized to be portable for connection with mobile device 400. For example, the size of card reader 401 can be miniaturized to an overall length of less than 1.5". In addition, the miniaturized card reader 401 is also designed to reliably read the card with minimum error via a single swipe by counteracting vendor specific filtering done by mobile device 401. Note that this broad overview is meant to be non-limiting as components to this process are represented in different embodiments.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, flash memory (e.g., SD cards, mini-SD cards, micro-SD cards, etc.), magnetic and/or solid state hard drives, read-only and recordable Blu-Ray® discs, ultra density optical discs, any other optical or magnetic media. The computer-readable media can store a computer program that is executable by at least one processing unit, such as a microcontroller, and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A card reader, comprising:
   a read head; an audio plug for engaging a corresponding audio jack associated with a host mobile device; device electronics communicatively coupled to the read head and the audio plug;
   and a memory comprising a plurality of instructions for causing the device electronics to detect when the audio plug is engaged with the audio jack and to perform, upon detecting the engaging of the audio plug with the audio jack, the steps of:
   establishing an initial connection with the host mobile device,
   receiving and decoding a plurality of instances of a first carrier wave transmitted from the host mobile device using different sets of parameters for the device electronics,
   selecting one of the sets of parameters which supports a highest connection speed between the card reader and the host mobile device at the audio plug; and
   configuring the device electronics to establish a communications session with the host mobile device based on the selected one of the sets of parameters, and
   engaging in a payment transaction with the host mobile device using the communications session, the engaging comprising the card reader reading a card funding the payment transaction when the audio plug of the card reader is engaged with the audio jack associated with the host mobile device and during the communications session based on the selected one of the set of parameters supporting the highest connection speed.

2. The card reader of claim 1, wherein the audio plug comprises a first input channel and a second input channel, and wherein the receiving and decoding, the evaluating, the selecting, and the configuring are performed separately for each of the first input channel and the second input channel.

3. The card reader of claim 1, wherein selecting the one of the sets of parameters comprises:
  evaluating a connection quality associated with each of the sets of parameters; and
  selecting the one of the sets of parameters from the sets of parameters for which the connection quality meets a minimum connection quality criteria.

4. The card reader of claim 3, wherein the memory further comprises instructions for causing the device electronics to:
  upon failing to determine that at least the sets of parameters meets the connection quality criteria, performing the receiving and decoding, the evaluating, the selecting, and the configuring for a plurality of instances of a second carrier wave transmitted by the host mobile device using different sets of parameters for the device electronics.

5. The card reader of claim 4, wherein the sets of parameters for receiving and decoding the first carrier wave and the sets of parameters for receiving and decoding the second carrier wave are different.

6. The card reader of claim 1, wherein the sets of parameters comprise at least one of amplifier gain, amplifier bias, an encoding scheme, an error correction scheme, and a modulation scheme.

7. The card reader of claim 1, wherein the memory further comprises instructions for causing the device electronics to perform the establishing by:
  transmitting an announce tone via the audio plug;
  determining whether a response tone is received via the audio plug;
  upon determining that the response tone was received via the audio plug, generating an acknowledgment of the response tone via the audio plug; and
  upon determining that the response tone was not received via the audio plug, adjusting at least one parameter for transmitting the announce tone and repeating the transmitting and determining.

8. A media reader, comprising:
  at least one media reading device, at least one audio connector for engaging an audio port associated with a networked mobile computing device; device electronics communicatively coupled to the at least one media reading device and the connector; and a memory comprising a plurality of instructions for causing the device electronics to detect when the audio connector is engaged with the audio port and to perform, upon detecting the engaging of the at least one audio connector with the audio port, the steps of:
  receiving and decoding a plurality of instances of at least one carrier wave received from the networked computing device by performing a sweep of at least one parameter at the device electronics;
  determining a set of parameters for the device electronics, based on the sweep, providing a highest connection speed between the media reader and the computing device;
  configuring the device electronics for a communications session using the set of parameters; and
  engaging in the communication session, wherein the communication session includes the computing device reading a media device and funding a payment transaction when the media reader is engaged with the computer device when the audio port and the audio connector are engaged.

9. The media reader of claim 8, wherein the audio connector comprises a plurality of input channels, and wherein the receiving and decoding, the determining, and the configuring are performed separately for each of the plurality of input channels.

10. The media reader of claim 8, wherein the determining further comprises:
  determining a connection quality for a plurality of parameter sets for the device electronics;
  selecting the set of parameters from a portion of the plurality of parameter sets for which the connect quality meets a minim connection quality criteria.

11. The media reader of claim 8, wherein the connection quality criteria comprises a maximum bit error rate (BER).

12. The media reader of claim 8, wherein the at least one parameter comprises at least one of amplifier gain, amplifier bias, an encoding scheme, an error correction scheme, and a modulation scheme.

13. The media reader of claim 8, wherein the device electronics comprises an input amplifier, and wherein the at least one parameter comprises at least one of a gain and a bias of the input amplifier.

14. The media reader of claim 8, wherein the device electronics further comprises:
  a microcontroller; and
  an analog-to-digital converter (ADC) communicatively coupled to the at least one media reading device, the audio connector, and the microcontroller,
  wherein the ADC is configured for converting analog signals from the audio connector and the at least one media reading device to digital signals for the microcontroller.

15. The media reader of claim 8, wherein the device electronics further comprises:
  a conditioning module configured for receiving analog signals from the audio connector and conditioning the analog signals;
  an analog-to-digital converter (ADC) for receiving the conditioned analog signals from the conditioning module and converting the conditioned analog signals to digital signals; and
  a microcontroller configured for receiving and processing the digital signals and for controlling the conditioning module during the sweep.

16. A non-transitory computer readable storage medium having stored thereon a computer program for operating a processor in a device with an audio signaling element, the computer program comprising a plurality of code sections which when executed by a processor performs the steps of:
  receiving and decoding a plurality of instances of at least one carrier wave, via the audio signaling element at a mobile computing device, the at least one carrier wave being received from an audio element of the mobile computing device when the device and the mobile computing device are operatively engaged through the audio signaling element, using different sets of parameters, each of the at least one carrier wave associated with a different encoding scheme;
  calculating a bit error rate (BER) for each of the plurality of instances;
  determining whether the BER for at least one of the instances meets a BER criteria;
  upon determining that the BER for at least one of the instances meets the BER criteria, establishing a communications session via the audio signaling element using a one of the different sets of parameters associated with meeting the BER criteria; wherein each of the different coding schemes associated with a different connection speed between the device and the mobile computing device, and wherein the plurality of code sections further comprises code sections, which when executed by the processor perform the steps of selecting a one of the encoding schemes associated with the at least one of the instances that meets the BER criteria and is associated with a highest connection speed between the device and the mobile computing device, and engaging in the communication session of the device and the mobile computing device, including funding a financial transaction when the device and mobile device are engaged through the audio signaling equipment.

17. The computer readable storage medium of claim 16, wherein the audio signaling element comprises a plurality of input channels, and wherein the plurality of code sections comprise code sections for performing the receiving and decoding, the calculating, the determining, and the configuring separately for each of the plurality of input channels.

18. The computer readable storage medium of claim 16, wherein the memory further comprises instructions for causing the device electronics to:

upon failing to determine that the BER for at least one of the instances meets the BER criteria, performing the receiving and decoding, the calculating, the determining, and the configuring for a plurality of instances of a second carrier wave.

19. The computer readable storage medium of claim 16, wherein the different sets of parameters for each of the at least one carrier wave are different.

20. The computer readable storage medium of claim 16, wherein the parameters comprise at least one of amplifier gain, amplifier bias, and a modulation scheme.

21. The computer readable storage medium of claim 16, wherein the plurality of code sections further comprises code sections for:

transmitting an announce tone via the audio plug;

determining whether a response tone is received via the audio plug;

upon determining that the response tone was received via the audio plug, generating an acknowledgment of the response tone via the audio plug; and upon determining that the response tone was not received via the audio plug, adjusting at least one parameter for transmitting the announce tone and repeating the transmitting and determining.

\* \* \* \* \*